US012610341B2

(12) United States Patent (10) Patent No.: US 12,610,341 B2

Hayashi et al. (45) Date of Patent: Apr. 21, 2026

(54) COMMUNICATION CONTROL SYSTEM, COMMUNICATION SYSTEM CONTROL METHOD, AND RECORDING MEDIUM

(71) Applicant: NEC Corporation, Tokyo (JP)

(72) Inventors: Kazuyuki Hayashi, Tokyo (JP); Masakazu Ono, Tokyo (JP); Junichi Funada, Tokyo (JP); Kenji Wakafuji, Tokyo (JP); Kohei Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 316 days.

(21) Appl. No.: 18/390,442

(22) Filed: Dec. 20, 2023

(65) Prior Publication Data

US 2024/0214972 A1 Jun. 27, 2024

(30) Foreign Application Priority Data

Dec. 27, 2022 (JP) ................................. 2022-210707

(51) Int. Cl.
*H04W 64/00* (2009.01)
*H04B 7/185* (2006.01)
*H04W 84/06* (2009.01)

(52) U.S. Cl.
CPC ...... *H04W 64/003* (2013.01); *H04B 7/18508* (2013.01); *H04W 84/06* (2013.01)

(58) Field of Classification Search
CPC ........................... H04W 64/003; H04W 84/06; H04B 7/18508; H04B 7/18504
See application file for complete search history.

(56) References Cited

U.S. PATENT DOCUMENTS

| | | | | |
|---|---|---|---|---|
| 11,290,206 | B2 * | 3/2022 | Xu ........................ | H04B 7/0632 |
| 11,641,644 | B2 * | 5/2023 | Badic ................... | G05D 1/6987 |
| | | | | 370/329 |
| 12,371,197 | B2 * | 7/2025 | Abhigyan ................ | G08G 5/22 |
| 12,425,894 | B2 * | 9/2025 | Buzzalino ............. | H04W 24/10 |
| 2017/0012698 | A1 * | 1/2017 | Laufer ............... | H04B 7/18536 |
| 2019/0044633 | A1 * | 2/2019 | Kobayashi ........... | H04B 17/309 |
| 2023/0041568 | A1 * | 2/2023 | Pan ........................ | H04W 4/029 |
| 2023/0309072 | A1 * | 9/2023 | Tran ................... | H04B 7/18506 |
| 2023/0413303 | A1 * | 12/2023 | Vivanco ................ | H04W 72/56 |
| 2025/0333194 | A1 * | 10/2025 | Abhigyan ................ | G08G 5/22 |
| 2025/0357960 | A1 * | 11/2025 | Bai ....................... | H04B 1/3838 |

FOREIGN PATENT DOCUMENTS

| | | | |
|---|---|---|---|
| JP | 2019-213079 A | 12/2019 | |
| JP | 7076659 B1 | 5/2022 | |
| JP | 7129538 B1 | 9/2022 | |

* cited by examiner

*Primary Examiner* — Fayyaz Alam
(74) *Attorney, Agent, or Firm* — Sughrue Mion, PLLC

(57) ABSTRACT

A communication control system includes at least one processor, and the at least one processor carries out: a predicting process of making predictions of a future status of communication of a communication system in a plurality of stages; and a controlling process of performing control of the communication system, the control being based on a result of a prediction in each of the plurality of stages, and in the controlling process, the at least one processor determines, in accordance with the result of the prediction in one of the plurality of stages, whether it is necessary to move the air vehicle and controls the air vehicle.

16 Claims, 8 Drawing Sheets

COMMUNICATION CONTROL SYSTEM, COMMUNICATION SYSTEM CONTROL METHOD, AND RECORDING MEDIUM

CROSS REFERENCE TO RELATED APPLICATIONS

This application is based upon and claims the benefit of priority from Japanese Patent Application No. 2022-210707 filed on Dec. 27, 2022 the disclosure of which is incorporated herein in its entirety by reference.

TECHNICAL FIELD

The present invention relates to a communication control system, a communication system control method, and a recording medium that are for controlling a communication system.

BACKGROUND ART

Recently, a technique has been developed in which not only a ground base station but also a non-terrestrial network (NTN) base station is used for providing wireless communication services. For example, Patent Literature 1 discloses a technique for providing a terminal with wireless communication services with use of a high altitude platform station (HAPS), or a stratospheric platform. According to the technique disclosed in Patent Literature 1, the HAPS is moved to an area in which the amount of cloud or rainfall is smaller than a predetermined value.

CITATION LIST

Patent Literature

Patent Literature 1

Japanese patent No. 7129538

SUMMARY OF INVENTION

Technical Problem

The inventors of the present invention is thinking of predicting a future status of communication of a communication system and controlling the movement of an HAPS and the like on the basis of a result of the prediction.

However, the prediction of a future status of communication of a communication system requires complicated computations. Therefore, it takes time to complete the prediction, and thus makes it impossible in some cases to early determine whether it is necessary to move the HAPS and the like. In a case where it is impossible to early determine whether it is necessary to move the HAPS and the like, the movement of the HAPS and the like is caused to delay, and a state where communication is impossible could occur. Even with the technique disclosed in Patent Literature 1, this problem cannot be solved.

An example aspect of the present invention has been made in view of the above problem, and example object thereof is to provide a technique of timely acquiring a result of a prediction of a future status of communication of a communication system and controlling the communication system.

Solution to Problem

A communication control system in accordance with an example aspect of the present invention is a communication control system for controlling a communication system which includes a terminal and a base station, the communication control system includes at least one processor, the base station includes a ground base station and an NTN base station, the NTN base station includes an air vehicle, the at least one processor carries out: a predicting process of making predictions of a future status of communication of the communication system in a plurality of stages; and a controlling process of performing control of the communication system, the control being based on a result of a prediction in each of the plurality of stages, and in the controlling process, the at least one processor determines, in accordance with the result of the prediction in one of the plurality of stages, whether it is necessary to move the air vehicle and controls the air vehicle.

A communication system control method in accordance with an example aspect of the present invention is a communication system control method for controlling a communication system which includes a terminal and a base station, the base station includes a ground base station and an NTN base station, the NTN base station includes an air vehicle, the communication system control method includes: making predictions of a future status of communication of the communication system in a plurality of stages; and performing control of the communication system, the control being based on a result of a prediction in each of plurality of stages, and the performing control includes, determining, in accordance with the result of the prediction in one of the plurality of stages, whether it is necessary to move the air vehicle and controlling the air vehicle.

A recording medium in accordance with an example aspect of the present invention is a non-transitory recording medium having recorded thereon a communication system control program for causing at least one computer to control a communication system which includes a terminal and a base station, the base station includes a ground base station and an NTN base station, the NTN base station includes an air vehicle, the communication system control program causes the at least one computer to carry out: a predicting process of making predictions of a future status of communication of the communication system in a plurality of stages; and a controlling process of performing control of the communication system, the control being based on a result of a prediction in each of the plurality of stages, the controlling process being determining whether it is necessary to move the air vehicle and controlling the air vehicle.

Advantageous Effects of Invention

With an example aspect of the present invention, it is possible to timely acquire a result of a prediction of a future status of communication of a communication system and control the communication system.

EXAMPLE EMBODIMENTS

First Example Embodiment

The following description will discuss a first example embodiment of the present invention in detail, with reference to the drawings. The present example embodiment is basic to an example embodiment which will be described later.

A communication control system 1 in accordance with the present example embodiment makes a prediction of a future status of communication of a communication system (not illustrated) which includes a terminal and a base station, and controls the communication system in accordance with a result of the prediction. The base station includes a ground base station and an NTN base station. The NTN base station includes an air vehicle. Examples of the air vehicle, which is the NTN base station, include an HAPS and an unmanned aerial vehicle (UAV).

Example Configuration

Figure 1:
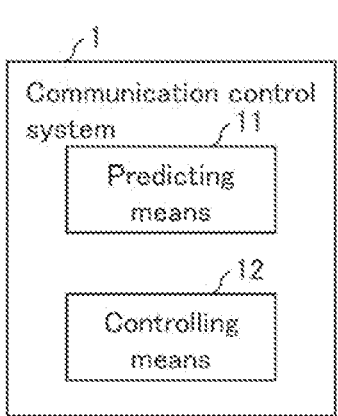
FIG. 1 is a block diagram illustrating an example of a schematic configuration of a communication control system in accordance with a first example embodiment of the present invention.

FIG. 1 is a block diagram illustrating an example of a schematic configuration of the communication control system 1 in accordance with the present example embodiment.

The communication control system 1 includes a predicting means 11 and a controlling means 12. Each of the predicting means 11 and the controlling means 12 may be formed by at least one apparatus (e.g., computer), and the apparatus forming the predicting means 11 and the apparatus forming the controlling means 12 may be separate apparatuses, or a single apparatus may provide the predicting means 11 and the controlling means 12. Each of the predicting means 11 and the controlling means 12 is an example implementation of an at least one processor.

The predicting means 11 make a prediction of a future status of communication of a communication system. Specifically, the predicting means 11 make predictions of a future status of communication of a communication system in a plurality of separate stages.

The status of communication of a communication system refers to at least one status related to communication in the communication system, and examples thereof include the between each terminal and its status of connection corresponding base station, the status of communication (including a communication rate and the quality of commutation) between each terminal and its corresponding base station, the statuses of the apparatuses (including the positions and beam directions of the apparatuses) of each terminal and its corresponding base station, and the status of disturbance (including meteorological conditions) which affects communication in the communication system.

The timings at which the predicting means 11 starts making predictions in a plurality of stages and the times of interest (target times) of the respective predictions can be set as appropriate. For example, a prediction may be started at a timing for which bad weather (e.g., typhoon) is predicted with the target time being set to a time which is a predetermined period of time after the timing, or may be started at a time a predetermined period of time before the target time that is set to the timing (e.g., store crowded hours) for which an increase in the amount of communication is predicted. Further, the predetermined period of time may be, for example, equal to or longer than a time required from when a flight plan is prepared to when an air vehicle 22 arrives at a site, in a case where the air vehicle 22 needs to be moved. Alternatively, the predetermined period of time may be equal to or longer than a time taken for the meteorological conditions to change to a degree which affects communication.

A prediction in each stage may be in such a manner that the accuracy of the prediction is improved by, starting with a prediction with low accuracy, gradually modifying the prediction each time a stage proceeds to the next stage, may be in such a manner that the prediction is made in its entirety by, starting with a partial prediction, gradually widening the prediction range each time a stage proceeds to the next stage, or may be in a combination of the foregoing manners. In addition, prediction schemes, apparatuses for making a prediction, etc. of the respective stages may be the same, or may be different from each other.

The controlling means 12 performs control of the communication system, the control being based on a result of the prediction in each stage. Examples of the control of the communication system include, but not limited to, control of movement of an air vehicle which is the NTN base station, control of a communication manner (including beam direction and radio wave intensity) of a base station, and control of a connection destination (a base station to which a terminal is connected) of the terminal.

The controlling means 12 determines whether it is necessary to move the air vehicle, which is the NTN base station, in particular in accordance with a result of the prediction in one of the stages, and controls the air vehicle. Examples of the control of the air vehicle may include calculation of a flight plan of the air vehicle (control of movement of the air vehicle) and control of the communication manner (including settings of a service area, a frequency, transmission power, etc.) of the air vehicle.

Example Operation

Figure 2:
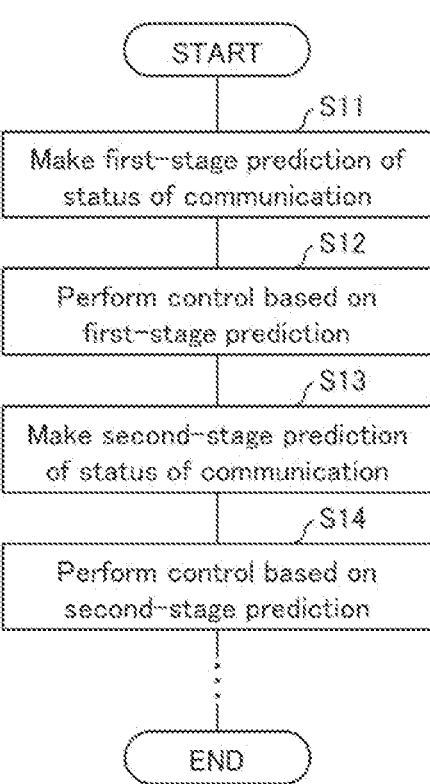
FIG. 2 is a flowchart illustrating an example of an outline operation of the communication control system in accordance with the first example embodiment of the present invention.

FIG. 2 is a flowchart illustrating an example of an outline operation of the communication control system 1 in accordance with the present example embodiment.

In step S11, the predicting means 11 makes a first-stage prediction of a future status of communication of the communication system. In step S12, the controlling means 12 performs control of the communication system, the control being based on a result of the first-stage prediction.

In step S13, the predicting means 11 makes a second-stage prediction of a future status of communication of the communication system. In step S14, the controlling means 12 performs control of the communication system, the control being based on a result of the second-stage prediction.

After that, the predicting means 11 makes predictions as many times as needed, and the predicting means 11 makes the N-stage prediction of a future status of communication of the communication system and the controlling means 12 performs control of the communication system, the control being based on a result of the N-stage prediction.

During the operation, in one of the stages (e.g., the first stage), the controlling means 12 determines, in accordance with a result of the prediction made in the one stage, whether it is necessary to move the air vehicle and controls the air vehicle.

Example Advantage of Present Example
Embodiment

For example, in some cases, an air vehicle which is the NTN base station is moved for the purpose of improving the status of communication of a satellite communication system. However, when the determination on whether it is necessary to move the air vehicle cannot be early made, a state where communication is impossible occurs before the air vehicle arrives at a place to go. In this respect, with conventional techniques, it takes long to predict the status of communication of a communication system, and it is therefore difficult to early determine whether it is necessary to move the air vehicle.

With the present example embodiment, the predicting means 11 makes predictions of a future status of communication of the communication system in a plurality of separate stages. This makes it possible to shorten the time required in each stage. Accordingly, the controlling means 12 is capable of timely acquiring a result of the prediction which is necessary for the determination on whether it is necessary to move an air vehicle which is the NTN base station and determining whether it is necessary to move the air vehicle. This makes it possible to avoid the occurrence of a state where communication is impossible, the state resulting from the delay of movement of the air vehicle, which is the NTN base station. As above, with the present example embodiment, it is possible to timely acquire a result of a prediction of a future status of communication of a communication system and control the status of communication.

Second Example Embodiment

The following description will discuss a second example embodiment of the present invention in detail, with reference to the drawings. A component that has the same function as a component described in the first example embodiment is assigned the same reference sign, and the description thereof is omitted where appropriate.

Example Configuration

Figure 3:
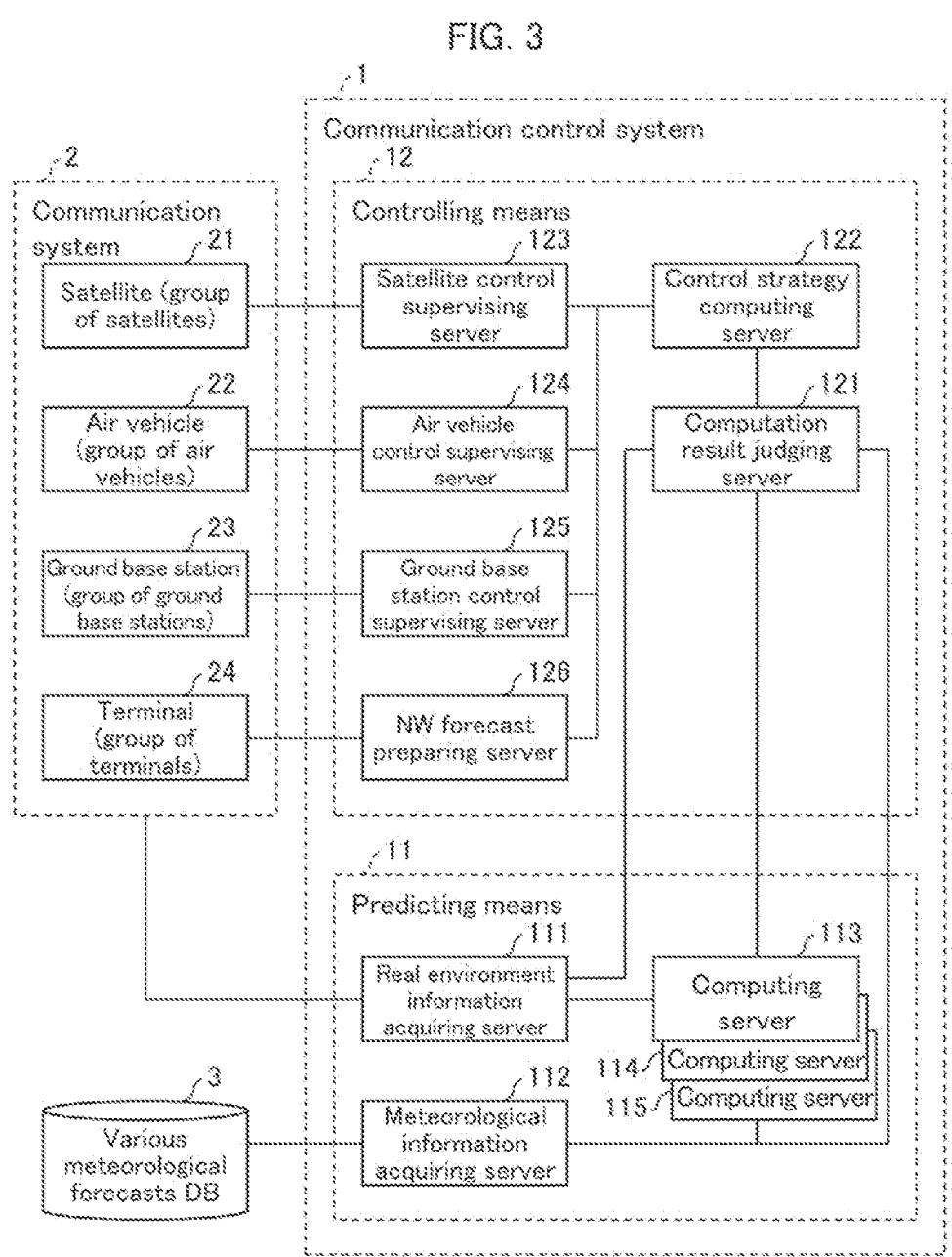
FIG. 3 is a block diagram illustrating an example of a schematic configuration of a communication control system and a communication system controlled by the communication control system, in accordance with a second example embodiment of the present invention.

FIG. 3 is a block diagram illustrating an example of a schematic configuration of a communication control system 1 and a communication system controlled by the communication control system 1, in accordance with the present example embodiment.

The communication system 2 includes a satellite (a group of satellites) 21, an air vehicle (a group of air vehicles) 22, a ground base station (a group of ground base stations) 23, and a terminal (a group of terminals) 24. Each of the satellite 21, the air vehicle 22, and the ground base station 23 is a base station which is connected to the terminal 24 to provide the terminal 24 with wireless communication services. Further, the satellite 21 and the air vehicle 22 are NTN base stations. The satellite 21 is, for example, a low earth orbit (LEO) satellite. The air vehicle 22 is, for example, an HAPS or a UAV.

A communication control system 1 in accordance with the present example embodiment includes a predicting means 11 and a controlling means 12. In the present example embodiment, each of the predicting means 11 and the controlling means 12 is formed by a plurality of servers (pieces of computing equipment).

The predicting means 11 includes a real environment information acquiring server 111, a meteorological information acquiring server 112, and computing servers 113 to 115. The real environment information acquiring server 111 acquires various kinds of information from the communication system 2. The meteorological information acquiring server 112 acquires meteorological information from various meteorological forecasts DB 3. The computing servers 113 to 115 make predictions in a plurality of stages. It should be noted that the number of the computing servers is indicated by way of example only, and may be one, or may be any number not less than 2.

The controlling means 12 includes a computation result judging server 121, a control strategy computing server 122, a satellite control supervising server 123, an air vehicle control supervising server 124, a ground base station control supervising server 125, and a NW forecast preparing server 126. The computation result judging server 121 determines a control plan (the contents of control) for controlling the communication system 2 in accordance with results of the predictions made by the predicting means 11. The control strategy computing server 122 determines a specific control policy of the communication system 2 in accordance with the control plan for controlling the communication system 2. The satellite control supervising server 123 controls the satellite 21 in accordance with the control policy. The air vehicle control supervising server 124 controls the air vehicle 22 in accordance with the control policy. The ground base station control supervising server 125 controls the ground base station 23 in accordance with the control policy. The NW forecast preparing server 126 notifies the terminal 24 of a NW forecast in accordance with the control policy. The details of each of the controls will be described later.
(Outline of Operation)

Figure 4:
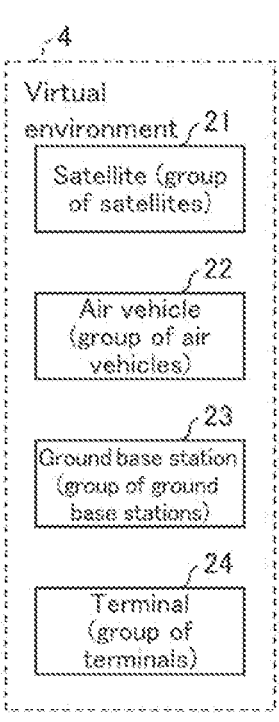
FIG. 4 is a schematic diagram illustrating an example of a virtual environment used by a prediction means in the second example embodiment of the present invention.

FIG. 4 is a schematic diagram illustrating an example of a virtual environment 4 used by a prediction means in the present example embodiment. According to an example embodiment, the predicting means 11 may make a prediction in accordance with a simulation of the communication system 2 in the virtual environment 4 in which the so-called digital twin is implemented. In other words, the predicting means 11 may carry out a simulation in accordance with information indicating a real environment, with use of the virtual environment 4, which contains movement of each equipment used in the communication system 2 and radio wave propagation, to predict a future status of communication of the communication system 2.

An area of the real environment corresponding to the virtual environment 4 can be set as appropriate. The extent of the area may be, for example, as wide as that of the service area of one satellite 21 or a few satellites 21 which has/have the widest service area(s) of the NTN base stations, but is not particularly limited.

Figure 5:
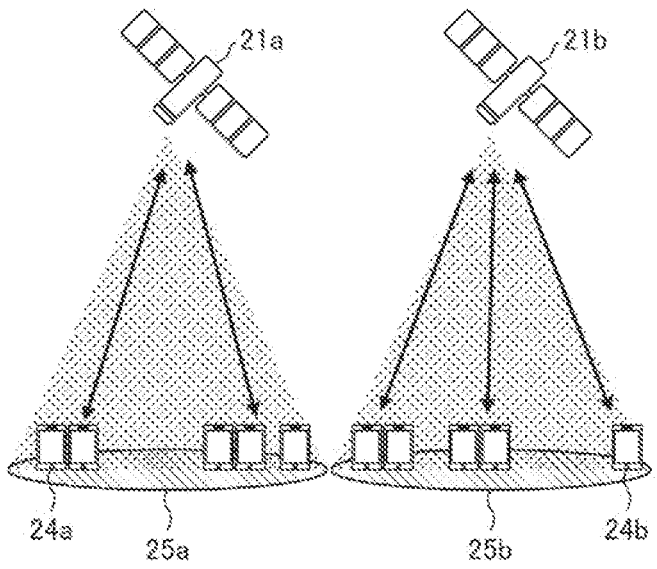
FIG. 5 is a schematic diagram illustrating an example of a real environment in the second example embodiment of the present invention.

FIG. 5 is a schematic diagram illustrating an example of the real environment at a time TO. As illustrated in FIG. 5, in the real environment at the time TO, a satellite 21a is connected to a plurality of terminals 24a present in a service area 25a of the satellite 21a. Further, a satellite 21b is connected to a plurality of terminals 24b present in a service area 25b of the satellite 21b. In FIGS. 5 to 8, the thickness of a double-headed arrow connecting the base station (satellite 21, air vehicle 22, or ground base station 23) and the terminal 24 indicates the communication rate at which communication between the base station and the terminal 24 is conducted.

The predicting means 11 acquires the status of such a real environment and incorporates the status into the virtual environment 4, and furthermore, predicts the virtual environment 4 at a future target time T2 in accordance with meteorological information, information indicating the radio wave condition of the communication system 2, a position history of the terminal 24, a network status history of the communication system 2, information indicating idle equipment, etc.

Figure 6:
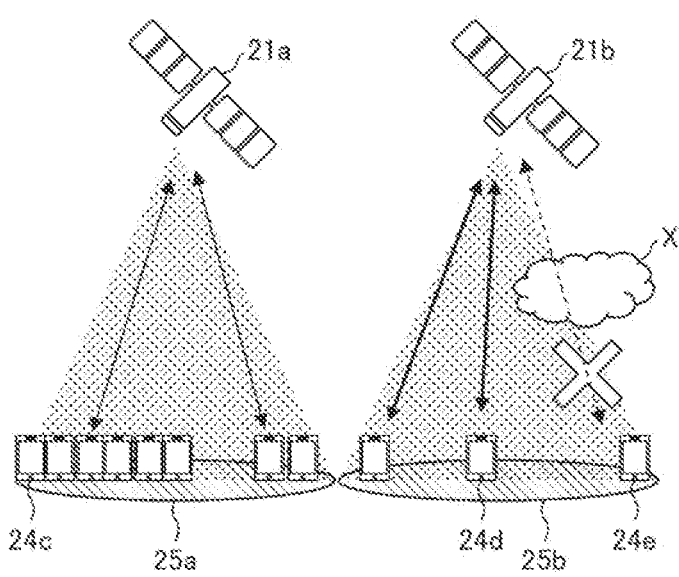
FIG. 6 is a schematic diagram illustrating an example of a future virtual environment predicted by the prediction means in the second example embodiment of the present invention.

FIG. 6 is a schematic diagram illustrating an example of the virtual environment 4 at the target time T2 predicted by the predicting means 11. As illustrated in FIG. 6, in the virtual environment 4 at the target time T2, the satellite 21a is connected to a plurality of terminals 24c present in the service area 25a. The number of the terminals 24c is greater than the number of the terminals 24a. Thus, the communication rate of the terminals 24c decreases. The satellite 21b is connected to the terminal 24d present in the service area 25a, but is in a state where communication with the terminal 24e present in the service area 25a is impossible due to the presence of cloud X.

The controlling means 12 determines the contents of control in accordance with a prediction of the future status of communication of the communication system 2, the prediction being as illustrated in FIG. 6 and having been made by the predicting means 11. Examples of the contents of control include:

a change in the service area of the satellite 21, a change in a connection destination of the terminal 24, movement of the air vehicle 22, notification provided to the terminal 24 of a network forecast, and use of the ground base station 23 that is idle.

For example, in a case where there is a terminal 24 communication with which is impossible, the controlling means 12 may change the service area of the satellite 21 such that the service area includes the terminal 24, may change the connection destination of the terminal 24 to a base station communication with which is possible (e.g., the ground base station 23 that is idle), or may move the air vehicle 22 to an area in which communication with the terminal 24 is possible and set the connection destination of the terminal 24 to the air vehicle 22. Further, in a case where there is a terminal 24 the communication rate of which will decrease, the controlling means 12 may reduce the number of connections of the base station to which the terminal 24 is connected (change the connection destinations of the other terminals 24 excluding the terminal 24 concerned), may change the connection destination of the terminal 24 concerned to a base station the communication rate of which is high, or may notify the terminal 24 of a network forecast indicating a change (decrease) in communication rate. Furthermore, in a case where a request that a communication rate should be maintained is made from a high-priority application of the terminal 24 having been notified of the network forecast indicating a change in the communication rate, the controlling means 12 may change the contents of control such that the communication rate of the terminal 24 is maintained.

The details (control parameters) of the contents of control performed by the controlling means 12 may be determined in accordance with setting values predetermined according to the contents of control. For example, in a case of performing, after a predetermined period of time, control so as to move the air vehicle 22 to a designated area, the controlling means 12 may control the output power of the air vehicle 22 on the basis of a speed of the air vehicle 22 required for the control, in accordance with a predetermined correspondence between the speed and the output power. Similarly, the controlling means may determine control parameters of the other contents of control, the control parameters being required for achievement of the purposes of the other contents of control, in accordance with the predetermined setting values. Further, according to an example aspect, the controlling means 12 may adjust the setting values according to a result of control. Therefore, it can be said that the difference between the status of communication of a real environment at a target time and a result of a prediction is a result of control performed, the status of communication being caused when the predicting means 11 make the prediction of the status of communication at the target time with use of a virtual environment and the controlling means 12 performs control in accordance with a result of the prediction. The controlling means 12 is capable of more accurately performing control by adjusting the control parameters (by feedback control) in accordance with the difference.

Figure 7:
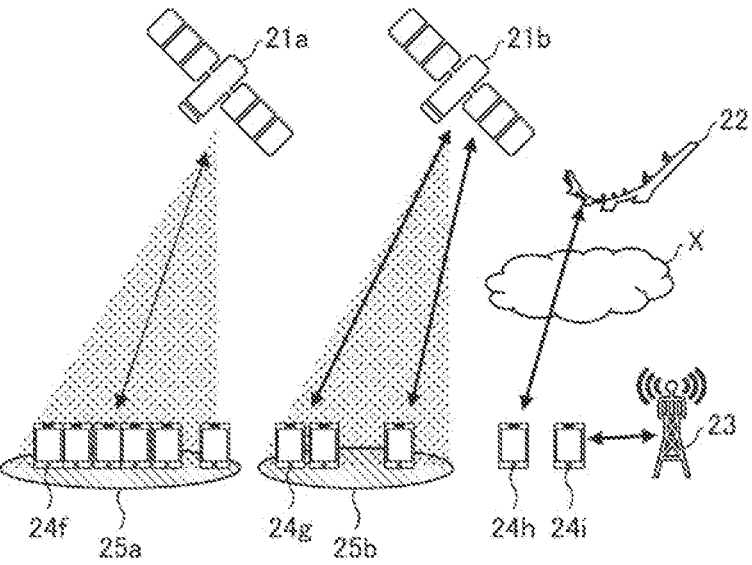
FIG. 7 is a schematic diagram illustrating an example of the contents of control determined by a controlling means in the second example embodiment of the present invention.

The contents of control performed by the controlling means 12 will be described below by taking an example. FIG. 7 is a schematic diagram illustrating an example of the contents of control which are determined by the controlling means 12 and which are to be performed on the virtual environment 4 at the target time T2. As illustrated in FIG. 7, the controlling means 12 improves the communication rate of terminals 24f by changing the service area 25a of the satellite 21a to reduce the number of terminals 24f present in the service area 25a. However, in a case where this cannot sufficiently improve the communication rate of the terminals 24f, the controlling means 12 notifies the terminals 24f of a network forecast indicating a change (decrease) in the communication rate. In addition, the controlling means 12 changes the service area 25b of the satellite 21b such that among the terminals 24c, a terminal 24g located outside the service area 25a of the satellite 21a is included but a terminal 24h in a state where communication is impossible due to a cloud X is not included. The controlling means 12 then moves the air vehicle 22 to an area in which the terminal 24h is capable of conducting communication and changes the connection destination of the terminal 24h to the air vehicle 22. In addition, the controlling means 12 connects a terminal 24*i* which newly has appeared to the ground base station 23 that has been idle.

Assume here that a request asking the communication system 2 to maintain the communication rate is made at a time T1 which is a predetermined period of time (e.g., 10 minutes to 20 minutes) after the time TO, through a high-priority application (e.g., an emergency call application) of the terminals 24*f* having been notified of the network forecast indicating a decrease in the communication rate. Assume also that the extent of the cloud X is even wider than predicted at the time TO. The predicting means 11 again predicts the virtual environment 4 at the target time T2 in accordance with information indicating the real environment at the time T1. The controlling means 12 then modifies the contents of control in accordance with the status of communication of the communication system 2 at the target time T2, the status of communication being predicted by the predicting means 11 in accordance with the information indicating the real environment at the time T1.

Figure 8:
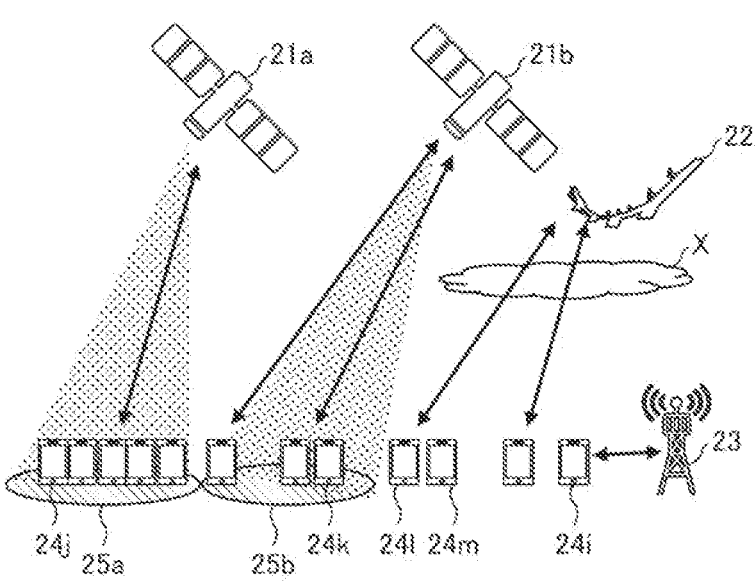
FIG. 8 is a schematic diagram illustrating an example of the contents of control modified by the controlling means in the second example embodiment of the present invention.

FIG. 8 is a schematic diagram illustrating an example of the contents of control which are modified by the controlling means 12 and which are to be performed on the virtual environment 4 at the target time T2. As illustrated in FIG. 8, the controlling means 12 maintains the communication rate of terminals 24*j* by, at the request made through the high-priority application of the terminals 24*j*, further reducing the extent of the service area 25*a* of the satellite 21*a* and further reducing the number of the terminals 24*j* present in the service area 25*a*. In addition, the controlling means 12 changes the service area 25*b* of the satellite 21*b* such that among the terminals 24*f*, a terminal 24*g* located outside the service area 25*a* of the satellite 21*a* is included but a terminal 241 in a state where communication is impossible due to the cloud X is not included. The controlling means 12 then change the connection destinations of the terminal 241 and a terminal 24*m* which newly has appeared to the air vehicle 22.

The contents of control (control parameters) of the controlling means 12 may be determined according to the status of communication indicated by a result of a prediction made by the predicting means 11. For example, in a case where there is a terminal 24 communication with which is impossible, the controlling means 12 may change the service area of the satellite 21 such that the service area includes the terminal 24, may change the connection destination of the terminal 24 to a base station communication with which is possible (e.g., the ground base station 23 that is idle), or may move the air vehicle 22 to an area in which communication with the terminal 24 is possible and set the connection destination of the terminal 24 to the air vehicle 22. Further, in a case where there is a terminal 24 the communication rate of which will decrease, the controlling means 12 may reduce the number of connections of the base station to which the terminal 24 is connected (change the connection destinations of the other terminals 24 excluding the terminal 24 concerned), may change the connection destination of the terminal 24 concerned to a base station the communication rate of which is high, or may notify the terminal 24 of a network forecast indicating a decrease in communication rate.

As above, the communication control system 1 in accordance with the present example embodiment makes a prediction at computation granularity intended for a determination on whether it is necessary to move the air vehicle 22 at a future target time, and after controlling the air vehicle 22, makes predictions at finer computation granularity until the target time is reached, to gradually modify the contents of control. This makes it possible to timely acquire a result of a prediction of a future status of communication of a communication system and control the communication system.

Example Operation

Figure 9:
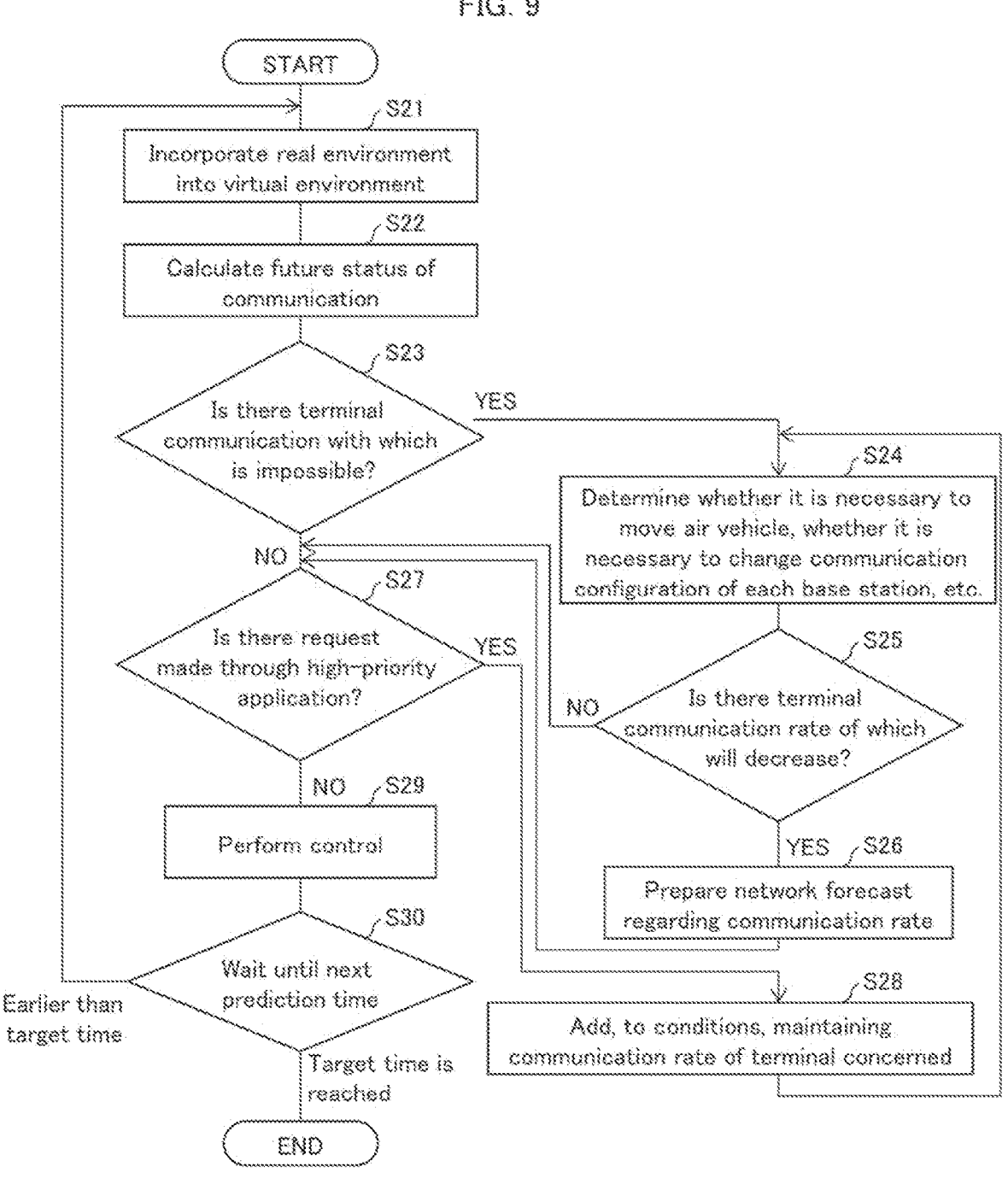
FIG. 9 is a flowchart illustrating an example of an outline operation of the communication control system in accordance with the second example embodiment of the present invention.
Figure 10:
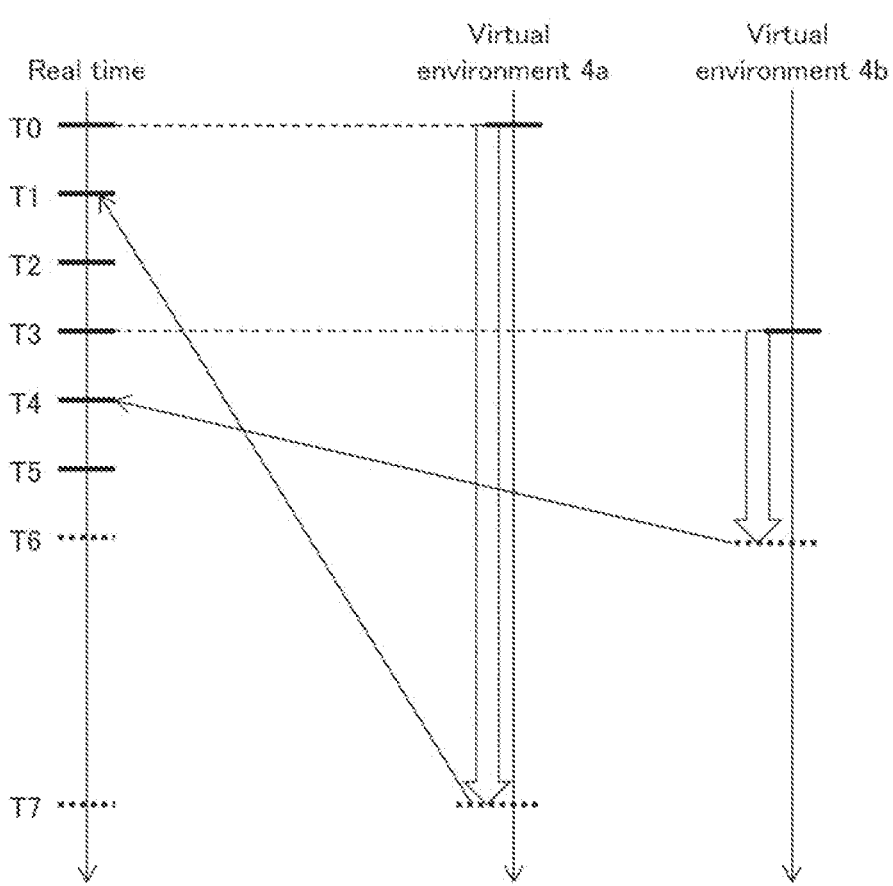
FIG. 10 is a sequence diagram illustrating the example of an outline operation of the communication control system in accordance with the second example embodiment of the present invention.

FIG. 9 is a flowchart illustrating an example of an outline operation of the communication control system 1 in accordance with the present example embodiment. FIG. 10 is a sequence diagram illustrating the example of the outline operation of the communication control system 1 in accordance with the present example embodiment. In the example illustrated in FIGS. 9 and 10, the predicting means 11 makes a first-stage prediction with use of a virtual environment 4*a* and makes a second-stage prediction with use of a virtual environment 4*b*. However, the present example embodiment is not limited to this.

At a real time T0, the predicting means 11 carries out step S21 to acquire various kinds of information and incorporate the information into the virtual environment 4*a*, to synchronize the status of the virtual environment with the status of the real environment.

The predicting means 11 then carries out step S22 to make the first-stage prediction with use of the virtual environment 4*a*. The first-stage prediction is a prediction the target time of which is a real time T7 (e.g., 1 hour after T0), and is made with use of the virtual environment 4*a*. The first-stage prediction is made at coarse computation granularity, and only needs to allow determination at least on whether it is necessary to move the air vehicle 22. Further, the computation granularity of the first-stage prediction may be such that the prediction can be made in an amount of time preferably not more than ½, more preferably not more than ¼, and even more preferably not more than ¹⁄₁₀ of a period of time until the target time. At a real time T1 (e.g., 5 minutes after T0), the predicting means 11 completes the first-stage prediction and supplies the controlling means 12 with a result of the prediction.

In a case where the result of the first-stage prediction indicates that there is the terminal 24 communication with which is impossible (YES in step S23), the controlling means 12 determines whether it is necessary to perform controls such as movement of the air vehicle 22 and a change in the communication configuration of each base station (step S24). Further, in a case where there is the terminal 24 the communication rate of which will decrease (YES in step S25), a network forecast indicating a change in the communication rate is prepared (step S26).

Furthermore, in a case where there is a request made through the high-priority application of the terminal 24 (YES in step S27), maintaining the communication rate of the terminal 24 concerned is added to conditions (step S28), and step S24 is carried out again.

Subsequently, at a real time T2, determined control is performed (step S29). For example, in a case where it has been determined in step S24 that the air vehicle 22 should be moved, the controlling means 12 starts control of the air vehicle 22 such as preparation of a flight plan of the air vehicle 22 (including fuel calculation and air route setting) or takeoff preparation.

The communication control system 1 then waits until the next prediction time T3 (e.g., 15 minutes after TO), and the operation is returned to step S21 (step S30). The interval between prediction times is not particularly limited, but may be, for example, an interval having a margin in addition to the processing time required for a prediction made by the predicting means 11 and control performed by the controlling means 12.

At a real time T3, the predicting means 11 carries out step S21 to acquire various kinds of information and incorporate the information into the virtual environment 4b, to synchronize the status of the virtual environment with the status of the real environment. In carrying out step S21, the predicting means 11 also incorporates, into the virtual environment, the contents of control performed by the controlling means 12 in step S29.

The predicting means 11 then carries out step S22 to make the second-stage prediction with use of the virtual environment 4b. The second-stage prediction is a prediction the target time of which is a real time T6 (e.g., 15 minutes after T3), and is made with use of the virtual environment 4b. The computation granularity of the second-stage prediction is finer than that of the first-stage prediction. At a real time T4 (e.g., 5 minutes after T3), the predicting means 11 completes the second-stage prediction and supplies the controlling means 12 with a result of the prediction.

In a case where the result of the second-stage prediction indicates that there is the terminal 24 communication with which is impossible (YES in step S23), the controlling means 12 determines whether it is necessary to perform controls such as modification to the movement of the air vehicle 22 and modification to the communication configuration of each base station (step S24). Further, in a case where there is the terminal 24 the communication rate of which will decrease (YES in step S25), a network forecast indicating a change in the communication rate is prepared (step S26).

Furthermore, in a case where there is a request made through the high-priority application of the terminal 24 (YES in step S27), maintaining the communication rate of the terminal 24 concerned is added to conditions (step S28), and step S24 is carried out again.

Subsequently, at a real time T5, the controlling means 12 performs determined control (step S29). For example, the controlling means 12 performs control specifically required to maintain a network, the control including a wireless frequency setting and a network construction setting. In a case where the target time is reached, the process is ended (step S30).

As above, the predicting means 11 makes predictions in a plurality of separate stages, so that even in a case of using a virtual environment to perform a simulation which takes a long time, computation for the predictions is completed in a short time by performing computation at computation granularity reduced to granularity required in each stage.

The computation granularity can be such that the computation granularity of the prediction in each stage is set to the computation granularity that allows a determination on whether to perform the corresponding one of the contents of control. For example, used as the computation granularity of the prediction in each stage can be computation granularity which allows a determination on whether it is necessary to move the air vehicle 22, computation granularity which allows a determination on whether to change the connection destination of the terminal 24, computation granularity which allows a determination on whether to notify the terminal 24 of a network forecast, or any other computation granularity.

Therefore, the predicting means 11 may change the computation granularity of the prediction for each stage, and the controlling means 12 may change the type of control of the communication system 2 in accordance with the computation granularity of the prediction. For example, without limitation, the predicting means 11 may make a prediction in the first stage at first computation granularity before making a prediction in the second stage at second computation granularity finer than the first computation granularity. The controlling means 12 may then perform control of movement of the air vehicle 22 in accordance with a result of the prediction in the first stage, and may perform control of at least one selected from the group consisting of the communication manners (including the setting of a service area, a frequency, a transmission power, etc.) of the satellite 21, the air vehicle 22, and the ground base station 23 and the connection destination of the terminal 24, in accordance with a result of the prediction in the second stage.

The number of stages of predictions is not particularly limited provided that the number of stages is equal to or greater than two. For example, the number obtained by dividing a period of time until a target time by a processing time required for prediction and control may be used. Further, the number of stages of predictions may be changed according to the status acquired by the predicting means 11 from a real environment.

The simulation scheme in each of the stages may differ from that in another stage. For example, a simulation via a mathematical model may be carried out in the first-stage prediction and a simulation via a network simulator may be carried out in the predictions in the second and subsequent stages. The predicting means 11 determines parameter conditions of the simulations according to a delay acceptable for determinations of a target time and each of the contents of control and the complexity of the communication system 2, and derives results of the simulations according to the parameter conditions.

The target time of the first-stage prediction can be a time which there is a possibility of an increase in the communication load on the communication system 2, or a time at which there is a possibility that communication of the communication system 2 becomes impossible. In the predictions in the second and subsequent stages, the target time may be the same as that in the first-stage prediction, or may be a target time earlier than that of the first-stage prediction.

(Information Used in Prediction)

Figure 11:
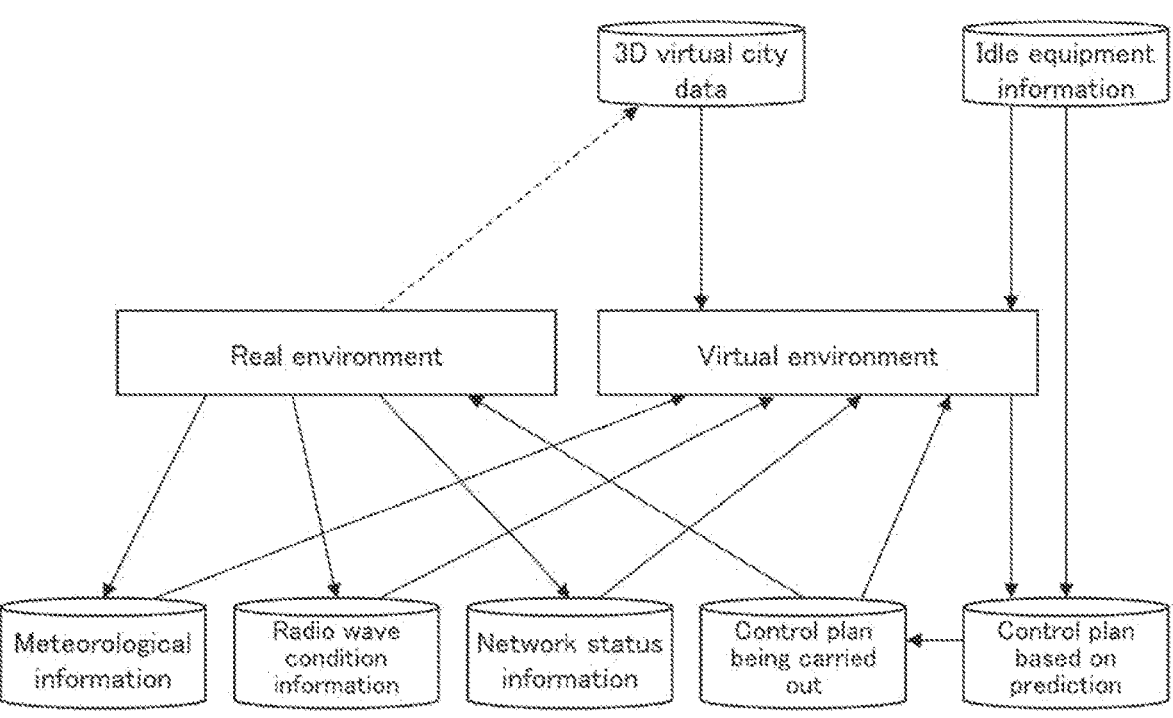
FIG. 11 is a schematic diagram illustrating an example of information used for a prediction in the second example embodiment of the present invention.

FIG. 11 is a schematic diagram illustrating an example information used in a predicting process in the present example embodiment. As illustrated in FIG. 11, the predicting means 11 may carry out a simulation with use of a virtual environment in accordance with various kinds of information acquired from a real environment, a control plan being carried out (the contents of control performed by the controlling means 12), idle equipment information (information indicating idle equipment), 3D virtual city data, and any other information, to predict a future status of communication of the communication system 2.

Examples of the various kinds of information acquired by the predicting means 11 from a real environment include radio wave condition information acquired by the real environment information acquiring server 111 from the communication system 2 (information indicating the radio wave condition of the communication system 2), network status information acquired by the real environment information acquiring server 111 from the communication system 2, and meteorological information acquired by the meteorological information acquiring server 112 from the various meteorological forecasts DB 3.

Examples of the radio wave condition information acquired by the real environment information acquiring server 111 from the communication system 2 include a radio wave map indicating the radio wave condition of each area, and a plan for frequency allocation to the satellite 21, the air vehicle 22, the ground base station 23, and the terminal 24. The computing servers 113 to 115 may incorporate the radio wave condition and the frequency allocation into the virtual environment.

Examples of the network status information acquired by the real environment information acquiring server 111 from the communication system 2 include network status history information (log) such as the traffic volume or congestion status of a network in the communication system 2, and information on the position history of the terminal 24. These kinds of history information can be used for the prediction of a future status of a network. For example, the computing servers 113 to 115 are capable of simulating a change in communication environment such as a change in required traffic due to the prediction of a change (such as movement) in a terminal density, by referring to history information regarding the day and/or the time zone the same as those/that of a target time (the time of interest of the prediction) to predict the number of terminals 24 and the position of each terminal 24 at the target time and incorporating the number and the position into the virtual environment.

Examples of the meteorological information acquired by the meteorological information acquiring server 112 from the various meteorological forecasts DB 3 include, but not limited to, predicted values of, for example, the type of a meteorological condition, the amount of rainfall, the amount of cloud, and the visibility. The computing servers 113 to 115 may incorporate the meteorological information into the virtual environment.

The control plan being carried out indicates the contents of control that are to be carried out by the controlling means 12. The controlling means 12 generates a control plan in accordance with a result of a prediction made by the predicting means 11, and add the control plan to the control plan being carried out. The computing servers 113 to 115 are capable of simulating a change in the real environment resulting from the control performed by the controlling means 12, by incorporating the control plans into the virtual environment.

The idle equipment information indicates equipment which is idle at the current point in time in the communication system 2 (e.g., such as the ground base station 23 that is idle or the air vehicle 22 that is idle). In a case where the control plans include a plan for using such idle equipment, the computing servers 113 to 115 may incorporate, into the virtual environment, the idle equipment indicated by the idle equipment information.

The 3D virtual city data is information which indicates the three-dimensional structure of the real environment corresponding to the virtual environment. The computing servers 113 to 115 are capable of simulating the blockage of a radio wave by a structural object, by incorporating the 3D data into the virtual environment.

As above, the computing servers 113 to 115 are capable of predicting a future status of communication of the communication system 2, by simulating the status of communication of a real environment with use of a virtual environment.

In an example aspect, the predicting means 11 may make predictions in a plurality of stages with use of a plurality of virtual environments. That is, the predicting means 11 may make a prediction of each of the stages with use of the virtual environment corresponding to that stage. In making the predictions, a computing server which varies from one stage (virtual environment) to another may be used. For example, in the example illustrated in FIG. 3, the computing servers 113, 114, and 115 may construct a virtual environment 1 for making the first-stage prediction, a virtual environment 2 for making the second-stage prediction, and a virtual environment 3 for making the third-stage prediction, respectively. Alternatively, the same computing server may be used for making the predictions in the respective stages.

Software Implementation Example

Figure 12:
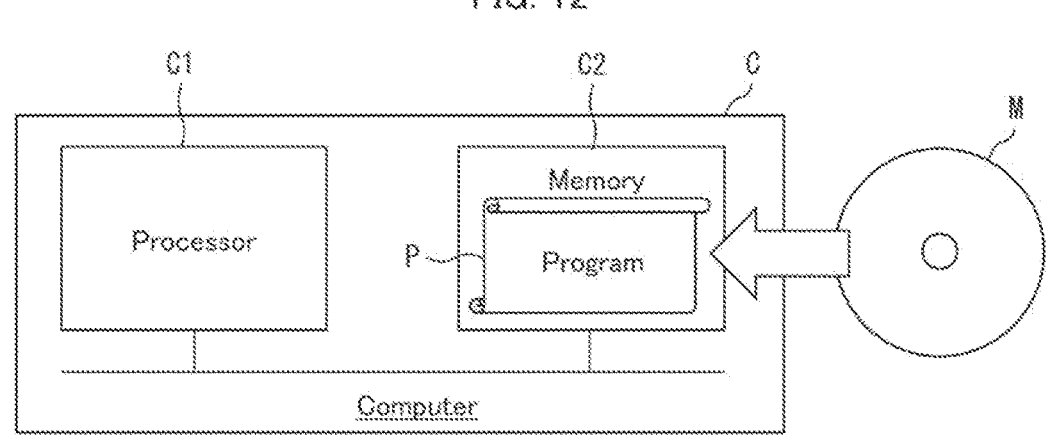
FIG. 12 is a block diagram illustrating an example of a hardware configuration in accordance with the example embodiments of the present invention.

Some or all of the functions of the communication control system 1 may be implemented by hardware such as an integrated circuit (IC chip), or may be implemented by software. In the latter case, the communication control system 1 is provided by, for example, at least one computer that executes instructions of a program that is software implementing the foregoing functions. An example (hereinafter, computer C) of such at least one computer is illustrated in FIG. 12. The computer C includes at least one processor C1 and at least one memory C2. The memory C2 has stored therein a program P for causing the computer C to operate as at least a part of the communication control system 1. The processor C1 of the computer C retrieves the program P from the memory C2 and executes the program P, so that the functions of the communication control system 1 are implemented.

Examples of the processor C1 can include a central processing unit (CPU), a graphic processing unit (GPU), a digital signal processor (DSP), a micro processing unit (MPU), a floating point number processing unit (FPU), a physics processing unit (PPU), a tensor processing unit (TPU), a quantum processor, a microcontroller, and a combination thereof. Examples of the memory C2 can include a flash memory, a hard disk drive (HDD), a solid state drive (SSD), and a combination thereof.

The computer C may further include a random access memory (RAM) into which the program P is loaded when executed and in which various kinds of data are temporarily stored. The computer C may further include a communication interface via which data is transmitted to and received from another apparatus. The computer C may further include an input-output interface via which input-output equipment such as a keyboard, a mouse, a display or a printer is connected.

The program P can be recorded on a non-transitory, tangible recording medium M capable of being read by the computer C. Examples of such a recording medium M can include a tape, a disk, a card, a semiconductor memory, and a programmable logic circuit. The computer C can obtain the program P via such a recording medium M. Alternatively, the program P can be transmitted through a transmission medium. Examples of such a transmission medium can include a communication network and a broadcast wave. The computer C can obtain the program P also via such a transmission medium.

Additional Remark 1

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

Additional Remark 2

The whole or part of the example embodiments disclosed above can be described as, but not limited to, the following supplementary notes.

Supplementary Note 1

A communication control system for controlling a communication system which includes a terminal and a base station,
    the base station including a ground base station and an NTN base station,
    the NTN base station including an air vehicle,
    the communication control system including: a predicting means for making predictions of a future status of communication of the communication system in a plurality of stages; and
    a controlling means for performing control of the communication system, the control being based on a result of a prediction in each of the plurality of stages,
    the controlling means being configured to determine, in accordance with the result of the prediction in one of the plurality of stages, whether it is necessary to move the air vehicle and control the air vehicle.

Supplementary Note 2

The communication control system described in supplementary note 1, in which the predicting means is configured to change computation granularity of the prediction for each of the plurality of stages, and
    the controlling means is configured to change a type of the control of the communication system in accordance with the computation granularity of the prediction.

Supplementary Note 3

The communication control system described in supplementary note 2, in which the predicting means is configured to make a prediction in a first stage at first computation granularity before making a prediction in a second stage at second computation granularity which is finer than the first computation granularity, and
    the controlling means is configured to perform control of movement of the air vehicle, in accordance with a result of the prediction in the first stage, and perform control of at least one selected from the group consisting of a communication manner of the base station and a connection destination of the terminal, in accordance with a result of the prediction in the second stage.

Supplementary Note 4

The communication control system described in supplementary note 1, in which the predicting means is configured to make the predictions in accordance with a simulation of the communication system in a virtual environment.

Supplementary Note 5

The communication control system described in any one of supplementary notes 1 to 4, in which the predicting means is configured to make the predictions in accordance with at least one selected from the group consisting of meteorological information, information indicating a radio wave condition of the communication system, a position history of the terminal, a network status history of the communication system, and information indicating idle equipment.

Supplementary Note 6

The communication control system described in supplementary note 5, in which the predicting means is configured to make the predictions further in accordance with contents of control performed by the controlling means.

Supplementary Note 7

The communication control system described in supplementary note 1, in which the controlling means is configured to notify the terminal of a change in a communication rate of the terminal, in accordance with the result of the prediction made by the predicting means.

Supplementary Note 8

The communication control system described in supplementary note 7, in which in a case where the terminal having been notified of the change in the communication rate requests that the communication rate be maintained, the controlling means is configured to perform the control of the communication system such that the communication rate of the terminal is maintained.

Supplementary Note 9

A communication system control method for controlling a communication system which includes a terminal and a base station,
    the base station including a ground base station and an NTN base station,
    the NTN base station including an air vehicle,
    the communication system control method including:
        making predictions of a future status of communication of the communication system in a plurality of stages; and
    performing control of the communication system, the control being based on a result of a prediction in each of plurality of stages,
    the performing control including, determining, in accordance with the result of the prediction in one of the plurality of stages, whether it is necessary to move the air vehicle and controlling the air vehicle.

Supplementary Note 10

A communication system control program for causing at least one computer to control a communication system which includes a terminal and a base station,
    the base station including a ground base station and an NTN base station,
    the NTN base station including an air vehicle,
    the communication system control program causing the at least one computer to carry out:
    a predicting process of making predictions of a future status of communication of the communication system in a plurality of stages; and
    a controlling process of performing control of the communication system, the control being based on a result of a prediction in each of the plurality of stages, the controlling process being determining whether it is necessary to move the air vehicle and controlling the air vehicle.

Supplementary Note 11

A communication control system for controlling a communication system which includes a terminal and a base station, the base station including a ground base station and an NTN base station, the NTN base station including an air vehicle, the communication control system including at least one processor, the at least one processor carrying out:

a predicting process of making predictions of a future status of communication of the communication system in a plurality of stages; and a controlling process of performing control of the communication system, the control being based on a result of a prediction in each of the plurality of stages, in the controlling process, the at least one processor determining, in accordance with the result of the prediction in one of the plurality of stages, whether it is necessary to move the air vehicle and controlling the air vehicle.

This communication control system may further include a memory, and this memory may have stored therein a program for causing the at least one processor to carry out the predicting process and the controlling process. In addition, this program may be recorded on a computer-readable, non-transitory, and tangible recording medium.

REFERENCE SIGNS LIST

1: Communication control system
2: Communication system
11: Predicting means
12: Controlling means
21: Satellite
22: Air vehicle
23: Ground base station
24: Terminal

The invention claimed is:

1. A communication control system for controlling a communication system which includes a terminal and a base station, the base station including a ground base station and an NTN base station, the NTN base station including an air vehicle, the communication control system comprising at least one processor, the at least one processor carrying out:

a predicting process of making predictions of a future status of communication of the communication system in a plurality of stages; and a controlling process of performing control of the communication system, the control being based on a result of a prediction in each of the plurality of stages, in the controlling process, the at least one processor determining, in accordance with the result of the prediction in one of the plurality of stages, whether it is necessary to move the air vehicle and controlling the air vehicle.

2. The communication control system according to claim 1, wherein in the predicting process, the at least one processor changes computation granularity of the prediction for each of the plurality of stages, and in the controlling process, the at least one processor changes a type of the control of the communication system in accordance with the computation granularity of the prediction.

3. The communication control system according to claim 2, wherein in the predicting process, the at least one processor makes a prediction in a first stage at first computation granularity before making a prediction in a second stage at second computation granularity which is finer than the first computation granularity, and in the controlling process, the least one processor performs control of movement of the air vehicle, in accordance with a result of the prediction in the first stage, and performs control of at least one selected from the group consisting of a communication manner of the base station and a connection destination of the terminal, in accordance with a result of the prediction in the second stage.

4. The communication control system according to claim 1, wherein in the predicting process, the at least one processor makes the predictions in accordance with a simulation of the communication system in a virtual environment.

5. The communication control system according to claim 1, wherein in the predicting process, the at least one processor makes the predictions in accordance with at least one selected from the group consisting of meteorological information, information indicating a radio wave condition of the communication system, a position history of the terminal, a network status history of the communication system, and information indicating idle equipment.

6. The communication control system according to claim 5, wherein in the predicting process, the at least one processor makes the predictions further in accordance with contents of control performed in the controlling process.

7. The communication control system according to claim 1, wherein in the controlling process, the at least one processor notifies the terminal of a change in a communication rate of the terminal, in accordance with the result of the prediction made in the predicting process.

8. The communication control system according to claim 7, wherein in a case where the terminal having been notified of the change in the communication rate requests that the communication rate be maintained, the at least one processor performs, in the controlling process, the control of the communication system such that the communication rate of the terminal is maintained.

9. A communication system control method for controlling a communication system which includes a terminal and a base station, the base station including a ground base station and an NTN base station, the NTN base station including an air vehicle, the communication system control method comprising:

making predictions of a future status of communication of the communication system in a plurality of stages; and performing control of the communication system, the control being based on a result of a prediction in each of plurality of stages, the performing control including, determining, in accordance with the result of the prediction in one of the plurality of stages, whether it is necessary to move the air vehicle and controlling the air vehicle.

10. The communication system control method according to claim 9, wherein in the making predictions, computation granularity of the prediction is changed for each of the plurality of stages, and in the performing control, a type of the control of the communication system is changed in accordance with the computation granularity of the prediction.

11. The communication system control method according to claim 10, wherein in the making predictions, a prediction in a first stage is made at a first computation granularity before a prediction in a second stage is made at second computation granularity finer than the first computation granularity, and in the performing control, control of movement of the air vehicle is performed in accordance with a result of the prediction in the first stage, and control of at least one selected from the group consisting of a communication manner of the base station and a connection destination of the terminal is performed in accordance with a result of the prediction in the second stage.

12. The communication system control method according to claim 9, wherein in the making predictions, the predictions are made in accordance with a simulation of the communication system in a virtual environment.

13. The communication system control method according to claim 9, wherein in the making predictions, the predictions are made in accordance with at least one selected from the group consisting of meteorological information, information indicating a radio wave condition of the communication system, a position history of the terminal, a network status history of the communication system, and information indicating idle equipment.

14. The communication system control method according to claim 13, wherein in the making predictions, the predictions are made further in accordance with contents of control performed in the performing control.

15. The communication system control method according to claim 9, wherein in the performing control, the terminal is notified of a change in a communication rate of the terminal, in accordance with the result of the prediction made in the making predictions.

16. A non-transitory recording medium having recorded thereon a communication system control program for causing at least one computer to control a communication system which includes a terminal and a base station, the base station including a ground base station and an NTN base station, the NTN base station including an air vehicle, the communication system control program causing the at least one computer to carry out:

a predicting process of making predictions of a future status of communication of the communication system in a plurality of stages; and a controlling process of performing control of the communication system, the control being based on a result of a prediction in each of the plurality of stages, the controlling process being determining whether it is necessary to move the air vehicle and controlling the air vehicle.

\* \* \* \* \*